3,556,662

Filed May 3, 1968

INVENTORS
Harold Levenstein
Albert Goldstein
Audrey J. Hebling

BY

ATTORNEY

United States Patent Office 3,556,662
Patented Jan. 19, 1971

3,556,662
DEVICE FOR DETERMINING BIREFRINGENCE
Harold Levenstein, Glen Cove, Albert Goldstein, Brooklyn, and Audrey J. Hebling, Bellrose, N.Y., assignors, by mesne assignments, to the United States of America as represented by the Secretary of the Navy
Filed May 3, 1968, Ser. No. 726,293
Int. Cl. G01n 21/44; G02f 1/24
U.S. Cl. 356—114         8 Claims

ABSTRACT OF THE DISCLOSURE

A device for electrically and directly indicating the birefringence of a transparent material which utilizes an electro optical sensor having a combination of polarizers, birefringent plates and photocells to produce voltages functionally dependent upon the birefringence of the transparent material. Difference amplifiers and a cathode ray tube or servo system analyze the photocell produced voltages to give a direct indication of the birefringence of the test material.

BACKGROUND OF THE INVENTION

This invention relates generally to devices for determining birefringence, and more particularly to a device which electronically determines directly the birefringence of a transparent material.

A large variety of optically transparent materials exhibit the phenomenon of birefringence or the splitting of a ray of incident light into two components which may travel at different velocities. In such materials the dielectric constant, $\epsilon$, is a function of the direction in which it is measured. For example, the relationship between the electric displacement vector, D, and the electric field intensity vector, E, for a given material can be given by a real symmetric tensor relationship in terms of the components of each vector expressed in a convenient Cartesian system as follows:

$$D_1 = \epsilon_{11}E_1 + \epsilon_{12}E_2 + \epsilon_{13}E_3$$
$$D_2 = \epsilon_{21}E_1 + \epsilon_{22}E_2 + \epsilon_{23}E_3$$
$$D_3 = \epsilon_{31}E_1 + \epsilon_{32}E_2 + \epsilon_{33}E_3$$

When a suitably oriented set of axes are chosen the aforesaid equations will simplify to:

$$D_1 = \epsilon_1 E_1$$
$$D_2 = \epsilon_2 E_2$$
$$D_3 = \epsilon_3 E_3$$

When the above dielectric constants are identical the material is optically isotropic and no birefringence will result. However, when the dielectric constants are different, the material will be optically anisotropic and the phenomenon of birefringence will occur. When birefringence takes place, the mode of propagation of the light within the material will depend upon the direction of propagation of the entering light.

The birefringence of transparent materials may be usefully employed in many optical devices. For example, birefringence may be used to produce multiple images, for optical filtering and in alignment mechanisms. In many materials birefringence occurs because of internal strains and may be used therefore as an indication of an undesirable state as for example in improperly annealed glass and regions in plastic assemblies around holes and inserts. Birefringence may be used in structural analysis of materials by the technique of photoelasticity which causes a stress to be induced in a material until birefringence results.

In the past, the birefringence of a material was determined visually by observation through for example, crossed polarizers, Nicol prisms or Senarmont prisms. Such prior art techniques have not been entirely satisfactory in that they require the use of moving optical elements and therefore are incapable of responding to rapidly changing dynamic stress conditions in a test medium. Thus, the response of such prior art techniques is limited to frequencies below the megacycle range. Another disadvantage of the prior art is its inflexibility with respect to change of optical source frequencies. Systems used in the prior art have reference plates which must be precisely a quarter wave of the optical source frequency if an accurate measurement is to be made. No technique is present in the prior art to compensate for the off-nominality of these quarter wave plates when the optical source frequency is changed.

SUMMARY OF THE INVENTION

Accordingly, one object of this invention is to provide a new and improved device for determining birefringence.

Another object of the invention is the provision of a new and improved device for directly determining the birefringence of a transparent material.

Still another object of the present invention is to provide a new and improved device for directly and electrically determining the birefringence of a transparent material.

A still further object of the instant invention is the provision of a new and improved device for determining birefringence which is capable of responding to rapidly changing dynamic stress conditions.

One other object of this invention is to provide a new and improved device for determining birefringence which is capable of use with a wide range of optical source frequencies.

Briefly, in acordance with this invention, these and other objects are attained by directing a polarized beam of light upon a material under test whose birefringence is to be determined. The light exiting from the material is optically analyzed and then converted into electrical signals which when analyzed give a direct measurement of the birefringence of the test material.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawing wherein.

DESCRIPTION OF THE PREFERRED EMBODIMENTS

Figure 1:
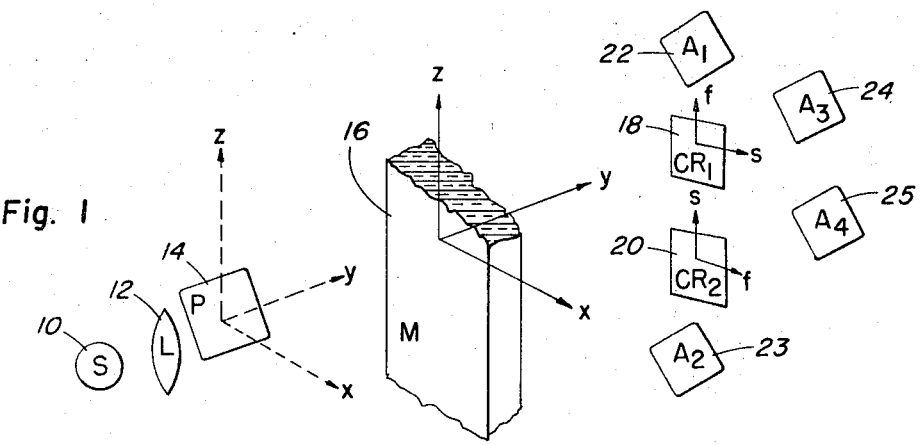
FIG. 1 is a perspective view of the electro optical sensor component of the birefringence determining device of the instant invention.
Figure 2:
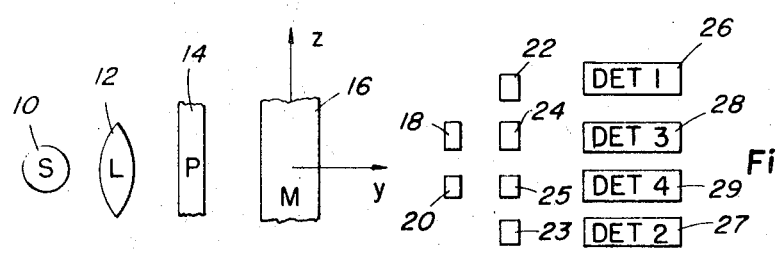
FIG. 2 is a cross-sectional view of the electro optical sensor shown in FIG. 1.

Referring now to the drawings wherein like reference characters designate identical or corresponding parts throughout the several views and more particularly to FIGS. 1 and 2 thereof wherein a preferred embodiment of the basic electro optical sensor component of the device to be hereinafter described for determining birefringence is shown as consisting essentially of a conventional light source 10, such for example as a standard monochromator or laser, a conventional collimator 12, such for example as a convergent lens, conventional polarizers 14 and 22–25, such for example as Polaroid sheets, a material 16 whose birefringence is to be determined and materials 18 and 20 whose birefringence is known. As shown in FIG. 2, conventional detectors 26–29, such for example as photocells, are a part of the electro optical sensor.

In operation, parallel light emitted from source 10 through collimating lens 12 passes through a linear polarizer 14, whose axis of polarization is oriented at 45° to the X axis. Only that light polarized with respect to the predetermined axis is supplied to the material 16 under test. The birefringence that will be measured will be that due to the difference in the index of refraction along the X and Z directions. The beam of light exiting from the material 16 is divided into four separate light beams either by physically dividing the area of light or by the use of optical mirrors as shown in FIGS. 4b and 4c and more fully explained hereinafter. The first beam of light will pass through the polarizing analyzer 22 which is oriented so that its axis of polarization is parallel to the axis of polarization of polarizer 14. Accordingly, the transmission of light through the polarizer 14, material 16, and analyzer 22 will be proportional to $T_1$ which depends upon birefringence in the following manner:

$$T_1 = \frac{1+\cos \phi}{2}$$

where $\phi$ is the relative retardation or birefringence of the material. The second beam of light will pass through the polarizing analyzer 23 which is oriented so that its axis of polarization is perpendicular to the axis of polarization of polarizer 14. The transmission of light that passes through analyzer 23 is proportional to $T_2$ in the following manner:

$$T_2 = \frac{1-\cos \phi}{2}$$

The third beam of light passes through the crystal material 18 whose known birefringence is added to the birefringence of the material 16 under test and then passes through analyzer 24. To effect the addition of the birefringence of the crystal material 18 to that of material 16, the orientation of crystal material 18 is set so that its fast axis F is along the fast axis Z of the material 16. The transmission of light passing through the analyzer 24 is then proportional to $T_3$ in the following manner:

$$T_3 = \frac{1+\cos (\phi+\alpha)}{2}$$

where $\alpha$ is the known birefringence of the crystal material 18. The fourth beam of light passes through the crystal material 20 whose known birefringence is subtracted from the birefringence of the material 16 under test and then passes through analyzer 25. To effect the subtraction of the birefringence of the crystal material 20 from that of material 16, the orientation of crystal material 20 is set so that its fast axis F is rotated 90° from the fast axis Z of the material 16. The transmission of light that passes through the analyzer 25 is then proportional to $T_4$ in the following manner:

$$T_4 = \frac{1+\cos (\phi-\alpha)}{2}$$

It should be understood that the crystal materials 18 and 20 are identical so that the known birefringence $\alpha$ of both are equal. Normally, crystal materials 18 and 20 are chosen so that the birefringence $\alpha$ approximates 90°. If $\alpha$ is exactly 90° then the orientation of crystal materials 18 and 20 relative to material 16 is unimportant, however analyzers 24 and 25 must still lie at 45° to the respective axes of crystal materials 18 and 20. Normally, the axis of polarization of analyzers 24 and 25 are parallel to the axis of polarization of polarizer 14.

If crystal materials 18 and 20 are chosen such that $\alpha = 90° + \delta$, where $\delta$ is a small amount, then the transmissions $T_1$ through $T_4$ become as follows:

$$T_1 = \frac{1+\cos \phi}{2}$$

$$T_2 = \frac{1-\cos \phi}{2}$$

$$T_3 = \frac{1+\sin (\phi+\delta)}{2}$$

$$T_4 = \frac{1-\sin (\phi-\delta)}{2}$$

In order to interpret these transmissions, each beam of light exiting from the analyzers 22–25 is supplied to linear response photodetectors 22–25 respectively, where electrical signals $E_1$ through $E_4$ are generated in proportion to the amount of light received.

Figure 3:
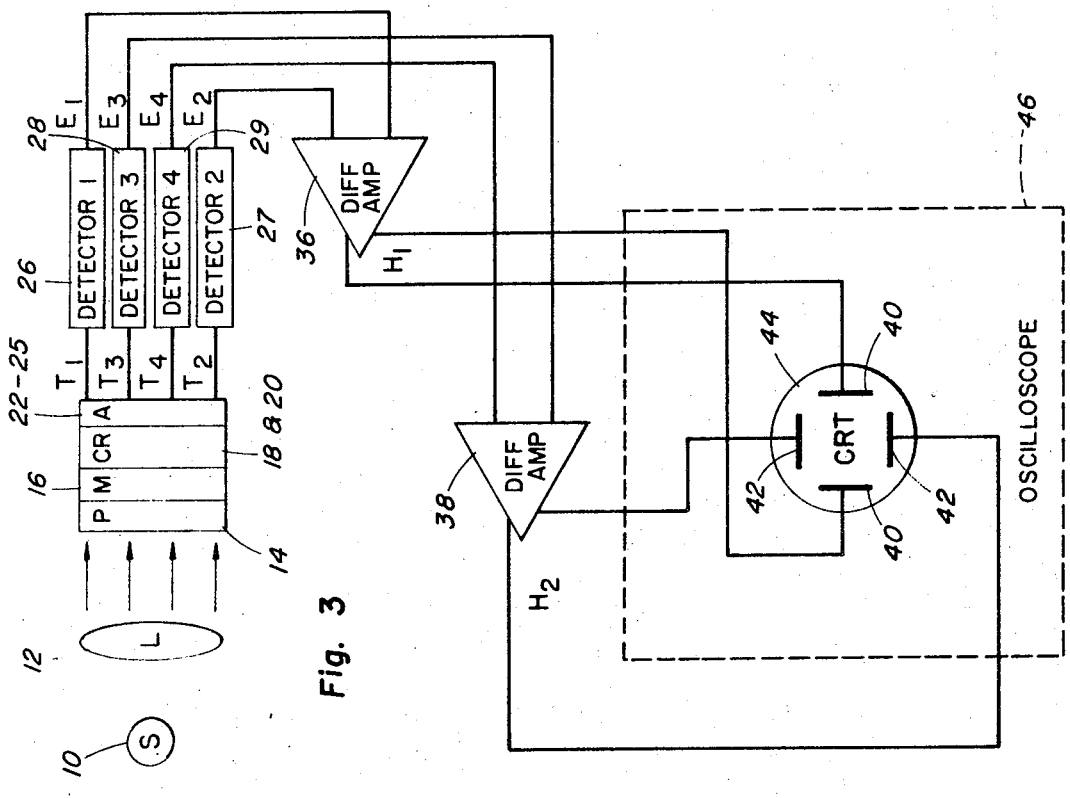
FIG. 3 is a block diagram of the preferred embodiment of the birefringence determining device of the present invention.

In the preferred embodiment for determining the birefringence of the test material in FIG. 3, the electrical signals $E_1$ through $E_4$ are subtracted in pairs in conventional difference amplifying circuits 36 and 38 to produce the following outputs:

$$H_1 = K_1(T_1 - T_2) = K_1 \cos \phi$$

$$H_2 = K_2(T_3 - T_4) = K_2 \sin \phi \cos \delta$$

where $K_1$ and $K_2$ are constants. If the constant $K_2$ of difference circuit 38 is adjusted to equal $K_1/\cos \delta$, then the outputs $H_1$ and $H_2$ from the difference circuits will become:

$$H_1 = K_1 \cos \phi$$

$$H_2 = K_1 \sin \phi$$

All that remains to indicate the angle $\phi$ and hence the birefringence of the test material 16 is to place the signal $H_1$ on the vertical plates 40 and signal $H_2$ on the horizontal plates 42 of a cathode ray tube 44 which may be part of an oscilloscope 46. Then the spot or the end of the sweep depending upon whether D.C. or A.C. is used, will trace out a circle on the face of cathode ray tube 44, as $\phi$ is varied, and the polar angle measured from the horizontal will give a direct electronic measurement of the birefringence $\phi$ of the test material 16.

It should be understood that the electro optic sensor crystal arrangement described above has been chosen to allow operation with crystal materials (normally ¼ wave plates) whose birefringence is not exactly 90°. This had been done deliberately since unless the chosen source frequency is exactly set to the frequency of the ¼ wave plates, the birefringence will not be exactly 90°. Accordingly, by using the optical arrangements described and the electrical compensating technique the sensor is made independent of the source frequency and deviations in birefringence of the ¼ wave plates and the system can operate with a wide range of frequency sources.

It should be further understood that while a specific arrangement of cystals, or quarter-wave plates and polarizers for establishing the desired four beams of light have been shown, other alternative arrangements are possible and useful in particular cases.

Figure 4A:
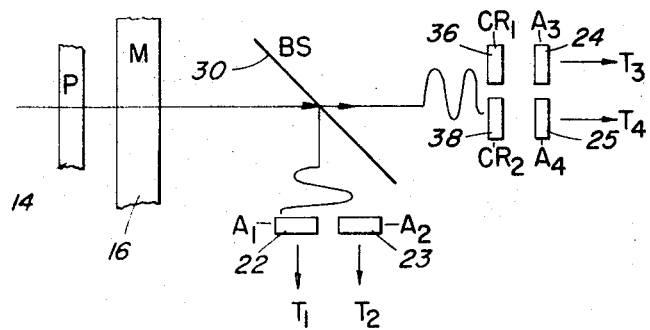
FIGS. 4a, 4b and 4c are alternative electro optical sensor components for use in the subject invention.
Figure 4B:
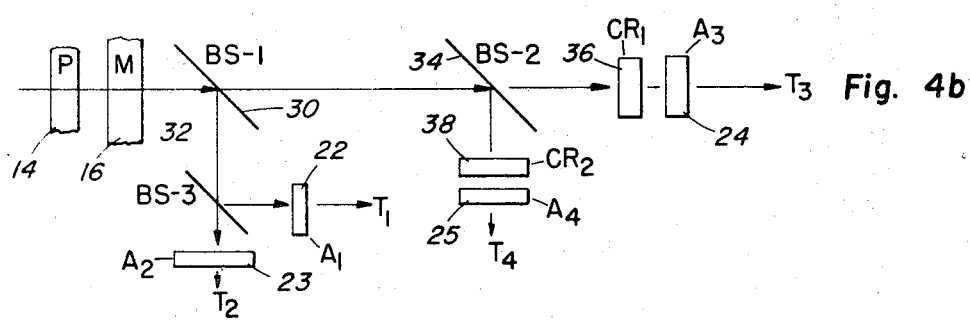
Figure 4C:
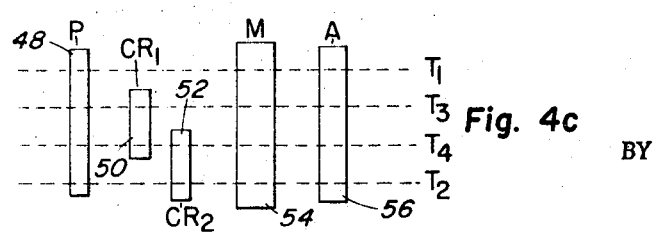

For example, in FIG. 4a the light exiting from material 16 strikes a conventional non-dichroic beam splitting or partially reflective mirror 30. One-half of the light will pass through beam splitter 30, while the other half will be reflected by the mirror. The use of such beam splitters allows for the use of a beam of smaller cross section, such as a laser, and also allows for a smaller cross section of crystal material to be used. Each of these two beams of light may be physically separated into two additional beams to enable the desired four beams of light to be obtained. It will be apparent as shown in FIG. 4b that two additional beam splitters 32 and 34 may be used to obtain the desired four beams without the need for any physical separation and to allow for further reduction in the cross-section of the material and for smaller cross-section beams to be used. Additionally, FIG. 4c illustrates a still further arrangement wherein is shown the combination of polarizers 48, a quarter-wave plate 50, a half-wave plate 52, a test material 54 and analyzers 56. In this combination, the plates must be calibrated at 90° and 180° respectively, so as to achieve the desired four beams.

Figure 5:
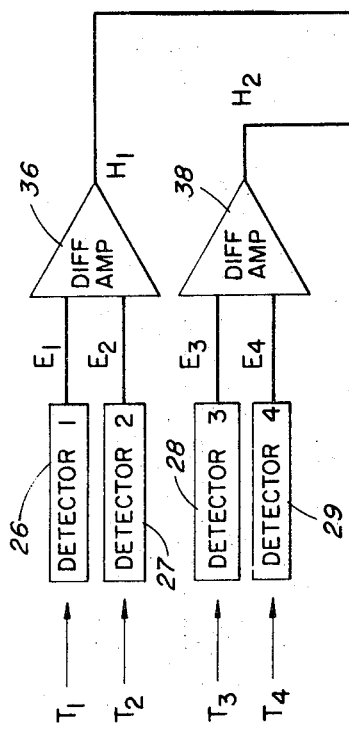
FIG. 5 is another embodiment of the birefringence determining device.
Figure 5:
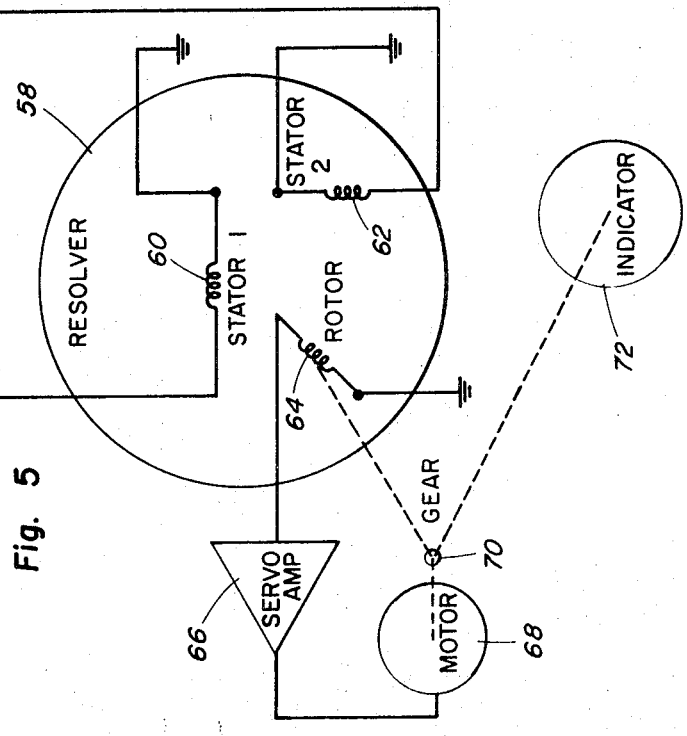

It should be understood that while FIG. 3 shows a cathode ray tube to indicate the birefringence of the test material, that a servo system such as that shown in FIG. 5 may be used. Signals $H_1$ and $H_2$ from difference circuits 36 and 38 are fed to the stator terminals 60 and 62 of a conventional resolver 58. A conventional feedback system which comprises a servo amplifier 66, motor 68 and gear 70 allows for a direct indication of the birefringence of the test material to be directly indicated on a mechanical dial or digital indicator 72 via rotor 64.

Obviously, numerous other modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A device for determining birefringence comprising
   means for projecting polarized light through a material whose birefringence is to be determined,
   means for projecting a portion of the light emerging from said material whose birefringence is to be determined through a material whose birefringence is known,
   first analyzer means for providing optical signals responsive to said light as it emerges from said material whose birefringence is to be determined,
   second analyzer means for providing optical signals responsive to the portion of the light projected through said material whose birefringence is known,
   means for detecting said optical signals responsive to said light as it emerges from said material whose birefringence is to be determined and for detecting said optical signals responsive to the portion of the light projecting through said material whose birefringence is known and for providing electrical signals responsive to said detected optical signals, and
   means responsive to said electrical signals for providing an indication of the birefringence of said material whose birefringence is to be determined.

2. A device for determining birefringence according to claim 1 wherein
   said material whose birefringence is known includes first and second materials whose birefringence is known,
   said first analyzer means for providing optical signals includes first and second analyzing polarizers responsive to the light as it emerges from said material whose birefringence is to be determined, and
   said second analyzer means for providing optical signals includes third and fourth analyzing polarizers responsive to the portion of the light projected through said first and said second materials whose birefringence is known, respectively.

3. A device for determining birefringence according to claim 2 wherein
   said first and said second analyzing polarizers are oriented to provide optical signals, respectively, given by the relation:

$$T_1=\frac{1+\cos \phi}{2}$$

$$T_2=\frac{1-\cos \phi}{2}$$

wherein $T_1$ and $T_2$ are optical signals proportional to the light emerging from said material whose birefringence, $\phi$, is to be determined, and
said third and said fourth analyzing polarizers are oriented to provide optical signals, respectively, given by the relation:

$$T_3=\frac{1+\cos (\phi+\alpha)}{2}$$

$$T_4=\frac{1+\cos (\phi-\alpha)}{2}$$

wherein $T_3$ is an optical signal proportional to the portion of the light projected through said first material whose birefringence, $\alpha$, is known and $T_4$ is an optical signal proportional to the portion of the light projected through said second material whose birefringence, $\alpha$, is known and $\phi$ is the birefringence of said material whose birefringence is to be determined.

4. A device for determining birefringence as in claim 3 wherein said means for detecting said optical signals includes four photocell detectors each of which is responsive to the optical signal transmitted from a respective one of said four analyzing polarizers whereby four electrical signals representative of said four optical signals are generated.

5. A device for determining birefringence as in claim 4 wherein said means responsive to said electrical signals includes two difference amplifiers one of which is responsive to the two of said four electrical signals generated which are representative of said two optical signals represented by $T_1$ and $T_2$ and the other of which is responsive to the other two of said four electrical signals generated which are representative of said two additional optical signals represented by $T_3$ and $T_4$ whereby the outputs of the two difference amplifiers respectively generate signals according to the following relations:

$$H_1=K_1(T_1-T_2)=K_1 \cos \phi$$
$$H_2=K_2(T_3-T_4)=K_1 \sin \phi$$

wherein $H_1$ and $H_2$ are electrical signals, $T_1$ through $T_4$ are optical signals, $\phi$ is the birefringence of said material whose birefringence is to be determined and $K_1$ and $K_2$ are constants.

6. A device for determining birefringence as in claim 5 wherein said means for projecting polarized light includes includes a cathode ray tube, the horizontal and vertical plates of which are respectively connected to the outputs of said two difference amplifiers whereby the birefringence of said material whose birefringence is to be determined is directly obtained.

7. A device for determining birefringence as in claim 1 wherein said means for projecting polarized light includes a light source, a collimator and a polarizer.

8. A device for determining birefringence comprising
   means for projecting polarized light along a first and second path, said first and said second paths including a material whose birefringence is to be determined,
   means for projecting polarized light along a third and fourth path, said third path and said fourth paths including a material whose birefringence is known and said material whose birefringence is to be determined,
   polarizer means for analyzing the light projected through the birefringent materials along each of said four paths,
   detector means responsive to the light from said analyzing polarizer means for providing electrical signals responsive thereto, and
   means responsive to said electrical signals for providing a direct indication of the birefringence of said material whose birefringence is to be determined.

(References on following page)

References Cited

UNITED STATES PATENTS

| | | | |
|---|---|---|---|
| 2,877,683 | 3/1959 | Fischer | 250—225 |
| 3,345,905 | 10/1967 | Acloque | 356—116 |

FOREIGN PATENTS

| | | | |
|---|---|---|---|
| 791,064 | 1958 | Great Britain | 356—116 |
| 1,002,616 | 1965 | Great Britain | 356—114 |
| 1,313,997 | 1962 | France | 356—116 |

OTHER REFERENCES

Schmidt-Tiedemann, "Improved Electronic Half-Shadow Method for Measurement of Birefringence and Dichroism," Rev. Sci. Instr., vol. 38, #5, May 1967, pp. 625–627.

Snell, "Towards Automatic Measurement of Birefringence," Nature, vol. 214, Apr. 1, 1967, pp. 78–79.

RONALD L. WIBERT, Primary Examiner

J. ROTHENBERG, Assistant Examiner

U.S. Cl. X.R.

250—225; 350—157; 356—116